United States Patent
Kim

(10) Patent No.: US 9,731,766 B2
(45) Date of Patent: Aug. 15, 2017

(54) FRONT VEHICLE BODY STRUCTURE

(71) Applicant: Hyundai Motor Company, Seoul (KR)

(72) Inventor: Heeju Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/941,883

(22) Filed: Nov. 16, 2015

(65) Prior Publication Data
US 2016/0368535 A1    Dec. 22, 2016

(30) Foreign Application Priority Data
Jun. 22, 2015    (KR) .................. 10-2015-0088627

(51) Int. Cl.
| | | |
|---|---|---|
| B62D 21/08 | (2006.01) | |
| B62D 29/00 | (2006.01) | |
| B62D 25/14 | (2006.01) | |
| B62D 21/11 | (2006.01) | |
| B62D 25/08 | (2006.01) | |
| B62D 21/09 | (2006.01) | |

(52) U.S. Cl.
CPC .............. B62D 21/08 (2013.01); B62D 21/11 (2013.01); B62D 25/08 (2013.01); B62D 29/008 (2013.01); *B62D 21/09* (2013.01); *B62D 25/085* (2013.01); *B62D 25/14* (2013.01)

(58) Field of Classification Search
CPC ...... B62D 21/08; B62D 21/11; B62D 29/008; B62D 25/14; B62D 25/08; B62D 21/09; B62D 25/085

USPC ..................................................... 296/203.02
See application file for complete search history.

(56) References Cited

U.S. PATENT DOCUMENTS

| | | | | |
|---|---|---|---|---|
| 7,810,878 B2* | 10/2010 | Nakamura | ............. | B62D 21/11 296/203.02 |
| 8,303,030 B2* | 11/2012 | Baccouche | ............. | B60R 19/24 296/203.01 |

FOREIGN PATENT DOCUMENTS

| | | |
|---|---|---|
| JP | 2010-006154 A | 1/2010 |
| JP | 4966814 B2 | 7/2012 |
| KR | 10-2001-0047982 A | 6/2001 |
| WO | WO 01/81154 A2 | 11/2001 |

* cited by examiner

*Primary Examiner* — Glenn Dayoan
*Assistant Examiner* — Dana Ivey
(74) *Attorney, Agent, or Firm* — Morgan, Lewis & Bockius LLP

(57) ABSTRACT

A front vehicle body structure may include front lower side members extended along a length direction of a vehicle, disposed in left and right sides along a width direction of the vehicle, and provided in a lower portion in a height direction of the vehicle, front upper side members extended along the length direction of the vehicle, disposed in left and right sides along the width direction of the vehicle, and provided higher in position than the front lower side members in the height direction of the vehicle, and fender apron upper members extended along the length direction of the vehicle, disposed in left and right sides along the width direction of the vehicle, and provided higher in position than the front upper side members in the height direction of the vehicle.

19 Claims, 14 Drawing Sheets

FRONT VEHICLE BODY STRUCTURE

CROSS-REFERENCE TO RELATED APPLICATION

The present application claims priority to Korean Patent Application No. 10-2015-0088627 filed Jun. 22, 2015, the entire contents of which is incorporated herein for all purposes by this reference.

BACKGROUND OF THE INVENTION

Field of the Invention

The present invention relates to a front vehicle body structure. More particularly, the present invention relates to a front vehicle body structure formed by combining space frames.

Description of Related Art

In general, a front vehicle body is a frame structure that is provided in a front side of a vehicle along a length direction of the vehicle to form an engine compartment, and includes a front end module forming a front side of the engine compartment and where a cooling module and a headlamp are mounted, a front fender apron member forming left and right sides of the engine compartment, accommodating a suspension system, and providing a space where vehicle wheels are installed, and a firewall provided in a rear side of the engine compartment to partition the engine compartment and a passenger compartment.

In addition, front side members extending along a length direction of the vehicle are respectively disposed in left and right sides in a lower portion of the engine compartment so as to reinforce structural rigidity of the front body of the vehicle, and a subframe is provided below the front side members and is thus combined with the front side members to mount and support the suspension system and the like as well as an engine and a transmission that are installed in the engine compartment.

Meanwhile, a so-called high performance vehicle promotes light weight in order to improve driving performance and thus space frames that are made of a relatively light-weighted aluminum material which is lighter than steel are combined to reduce the weight of the vehicle body.

In such an aluminum space frame vehicle body, small overlap collision stability and driving performance need to be improved by improving front collision response performance and installation rigidity of suspension arms of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front vehicle body structure in which front side members are appropriately arranged to improve front small overlap collision response performance of a vehicle to thereby more safely protect a passenger from a front small overlap collision accident, and rigidity of an installation portion of a suspension arm is enhanced to improve driving safety of the vehicle.

According to various aspects of the present invention, a front vehicle body structure may include front lower side members extended along a length direction of a vehicle, disposed in left and right sides along a width direction of the vehicle, and provided in a lower portion in a height direction of the vehicle, front upper side members extended along the length direction of the vehicle, disposed in left and right sides along the width direction of the vehicle, and provided higher in position than the front lower side members in the height direction of the vehicle, and fender apron upper members extended along the length direction of the vehicle, disposed in left and right sides along the width direction of the vehicle, and provided higher in position than the front upper side members in the height direction of the vehicle, in which the front upper side members may be further distanced to an outer side in the width direction than the front lower side members.

Front portions of each of the left side and the right side front lower side members in the length direction of the vehicle may be connected with each other by a front lower cross reinforcement member extended along the width direction of the vehicle, center portions of each of the left side and the right side front lower side members may be connected with each other by a center lower cross reinforcement member extended along the width direction of the vehicle, and rear portions of each of the left side and the right side front lower side members may be connected with each other by a dash lower cross reinforcement member extended along the width direction of the vehicle.

Front portions of each of the left side and the right side front upper side members may be connected with each other by a bumper beam extended in the width direction of the vehicle, rear portions of each of the left side and the right side front upper side members may be connected with each other by a dash center cross reinforcement member extended in the width direction of the vehicle, and the left side and the right side front upper side members and the dash center cross reinforcement member may be connected with each other by two inclination reinforcement members respectively disposed obliquely to the width direction and length direction of the vehicle.

The two inclination reinforcement members may be disposed to be oblique toward an outer side in the width direction of the vehicle from a center portion in the width direction of the vehicle and connected to the left side and the right side front upper side members.

Two front pillar members extended in the height direction of the vehicle may be disposed in the left and right sides in the width direction of the vehicle, respectively, and front portions of each of the left side and the right side fender apron upper members in the length direction of the vehicle may be connected with each other by a front upper cross reinforcement member extended along the width direction of the vehicle, rear portions of each of the left side and the right side fender apron upper members may be connected with each other by a rear upper cross reinforcement member extended along the width direction of the vehicle, and rear end portions of each of the left side and the right side fender apron upper members may be connected to the left side and the right side front pillar members by first joints.

Lateral ends of cowl upper cross reinforcement members that are extended along the width direction of the vehicle may be coupled to the left and right first joints.

The front lower side members, the front upper side member, and the fender apron upper members may be connected with each other by reinforcement panels extended in the height direction of the vehicle.

The front lower side members and the front upper side members may be connected with each other by a front side reinforcement member extended in the height direction of the vehicle from a center portion in the length direction of the vehicle.

Second joints may be coupled to portions where the front lower side members and the center lower cross reinforcement member are connected with each other and third joints may be coupled to portions where the front lower side members and the dash lower cross reinforcement member are connected with each other, and a first end of a lower arm may be engaged to each second joint and a second end of the lower arm is engaged to each third joint.

Fourth joints may be coupled to the front upper side members and lateral ends of an upper arm may be engaged to each fourth joint.

Fifth joints may be coupled to the fender apron upper members, each of the fourth joint and the fifth joint may be connected with each other by a shock absorber installation reinforcement member, and an upper portion of a shock absorber may be supported by the fifth joint by being engaged thereto.

A stabilizer bar extended along the width direction of the vehicle to control a moment behavior of the vehicle may be supported by the fourth joint by being engaged thereto.

The second joint may include a second joint body formed in the shape of a quadrangular plate, an upper flange bent to an inner side of the width direction of the vehicle from an upper end edge of the second joint body and then coupled to an upper surface of the front lower side member in the height direction of the vehicle, and a lower flange bent to an inner side of the width direction of the vehicle from a lower end edge of the second joint body and then coupled to a bottom surface of the front lower side member in the height direction of the vehicle, in which a combining flange where a first end of the front side reinforcement member is coupled by being inserted thereto may be formed protruding upward in the height direction of the vehicle in the upper flange, two extension bosses extended further to the inner side of the width direction of the vehicle from the upper flange and thus engaged to two positions of the center lower cross member may be provided in the upper flange, two protruding engaging bosses provided with two engaging holes that are distanced from each other back and forth along the length direction of the vehicle may be formed in the second joint body and thus the first end of the lower arm is coupled to the two engaging holes by being engaged thereto, and a plurality of radial-shaped ribs may be integrally protruded in the second joint body to connect the two engaging bosses to each other and connect each engaging boss to the second joint body so as to enhance structural rigidity.

The third joint may include a third joint body formed in the shape of a quadrangular plate, an upper flange bent to an inner side of the width direction of the vehicle from an upper end edge of the third joint body and then coupled to an upper surface of the front lower side member in the height direction of the vehicle, a lower flange bent to an inner side of the width direction of the vehicle from a lower end edge of the third joint body and then coupled to a bottom surface of the front lower side member in the height direction of the vehicle, an upper extension flange further extended backward from a rear upper end edge in a length direction of the third joint body and thus disposed in an upper portion in the height direction of the vehicle, and a lower extension flange further extended backward from a rear lower end edge in the length direction of the third joint body and thus disposed in a lower portion in the height direction of the vehicle, in which a combining groove where the dash lower cross reinforcement member is coupled by being inserted thereto may be provided between the upper extension flange and the lower extension flange, two engaging bosses provided with two engaging holes that are disposed at a distance from each other along the length direction of the vehicle may be formed protruded in the third joint body such that the second end of the lower arm is coupled to the engaging holes by being engaged thereto, and a plurality of radial-shaped ribs may be formed integrally protruded from the third joint body to connect the two engaging bosses to each other and connect each engaging boss to the third joint body for enhancing structural rigidity.

The dash center cross reinforcement member may be connected with the front pillar member through the rear side reinforcement member, and the front upper side member may be connected with the dash lower cross reinforcement member through the rear lower side reinforcement member.

A front portion of the fourth joint in the length direction of the vehicle may be coupled with the front side reinforcement member, a rear portion of the fourth joint may be coupled with the rear side reinforcement member and the rear lower side reinforcement member, and the shock absorber installation reinforcement member may be coupled to the fourth joint by being inserted therein.

Vertically disposed double closed cross surfaces of the front upper side member may be extended along the length direction of the front upper side member, an upper wall, a middle wall, and a lower wall forming the double closed cross surfaces may be partially cut, and the fourth joint may be coupled with the front upper side member while covering the cut portion.

The fourth joint may include a fourth joint body formed in a shape of a quadrangular plate, an upper flange bent to an inner side of the width direction of the vehicle from an upper end edge of the fourth joint body and then coupled to an upper surface of the front upper side member in the height direction of the vehicle, and a lower flange bent to an inner side of the width direction of the vehicle from a lower end edge of the fourth joint body and then coupled to a bottom side of the front upper side member in the height direction of the vehicle, in which a combining groove where the shock absorber installation reinforcement member is coupled by being inserted therein may be formed in a substantially center portion of the fourth joint body in the length direction of the fourth joint body, two engaging bosses provided with two engaging holes to which a first end of the upper arm is engaged may be formed in a protruded manner in a front portion in the length direction of the vehicle with reference to the combining groove, two engaging bosses provided with two engaging holes to which a second end of the upper arm may be formed in a protruded manner in a rear portion in the length direction of the vehicle with reference to the combining groove, and the two engaging bosses may be connected with each other by a plurality of radial-shaped ribs for enhancing structural rigidity.

A first combining flange where a second end of the front side reinforcement member is coupled by being inserted thereto, a second combining flange where the rear lower side reinforcement member is coupled by being inserted thereto, a support groove where the stabilizer bar is supported by being inserted thereto, and an engaging groove engaging the stabilizer bar may be provided in the lower flange, and a third combining flange where the rear side reinforcement member is coupled by being inserted thereto may be provided in a rear portion in the length direction of the fourth joint body.

Each member may be made of an aluminum material through an extrusion method, and each joint may be made of an aluminum material through a die-casting method.

In the front vehicle body structure according to various embodiments of the present invention, the lower front side members are extended substantially in parallel with a length direction of the vehicle, while the upper front side members are extended in a manner of gradually being distanced from each other toward the outer side in the width direction of the vehicle, such that the upper front side members reduce small overlap impact by properly absorbing the impact when a front small overlap collision accident occurs, thereby more safely protecting a passenger.

The side members manufactured through the extrusion method and the joints manufactured through the die-casting method are properly coupled with each other such that combination rigidity between the side members and the joints is enhanced, and when the suspension arm is installed in the joint, installation rigidity of the suspension arm is enhanced, thereby improving driving performance and ride comfort of the vehicle.

The shape of the joint manufactured through an expensive die-casting method is optimized to thereby reduce manufacturing cost of the front vehicle body and at the same time the weight of the front vehicle body can be reduced.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
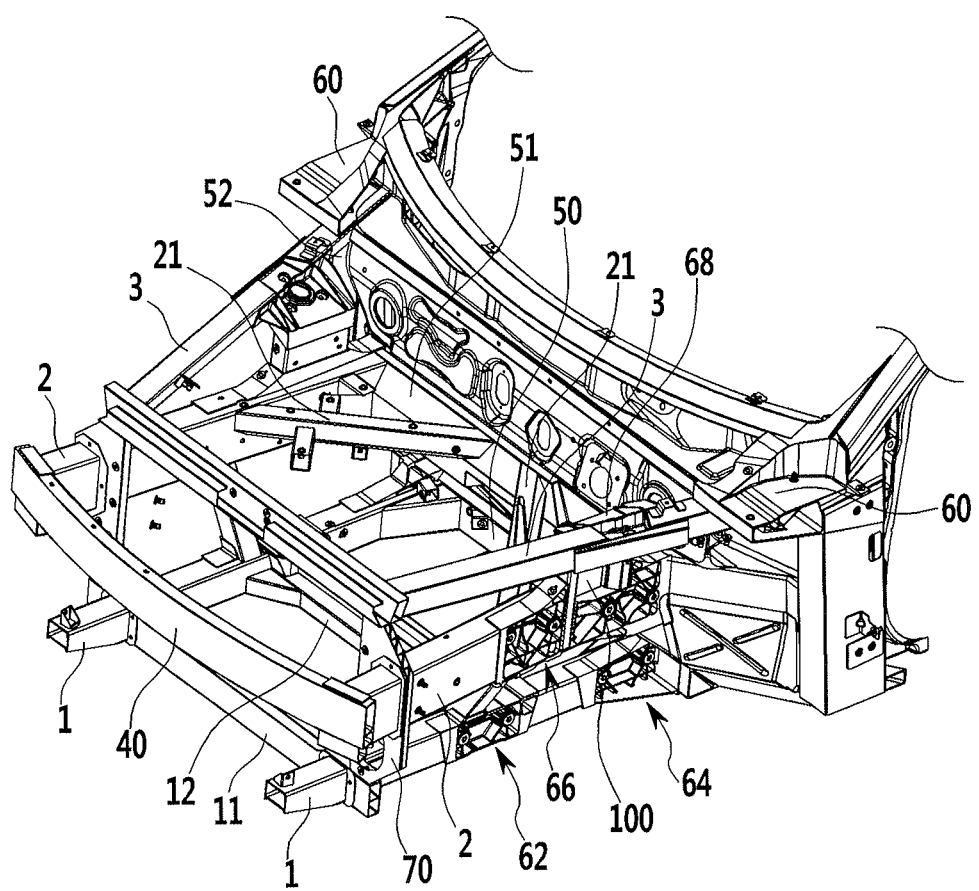
FIG. 1 is a perspective view of an exemplary front vehicle body structure according to the present invention.
Figure 2:
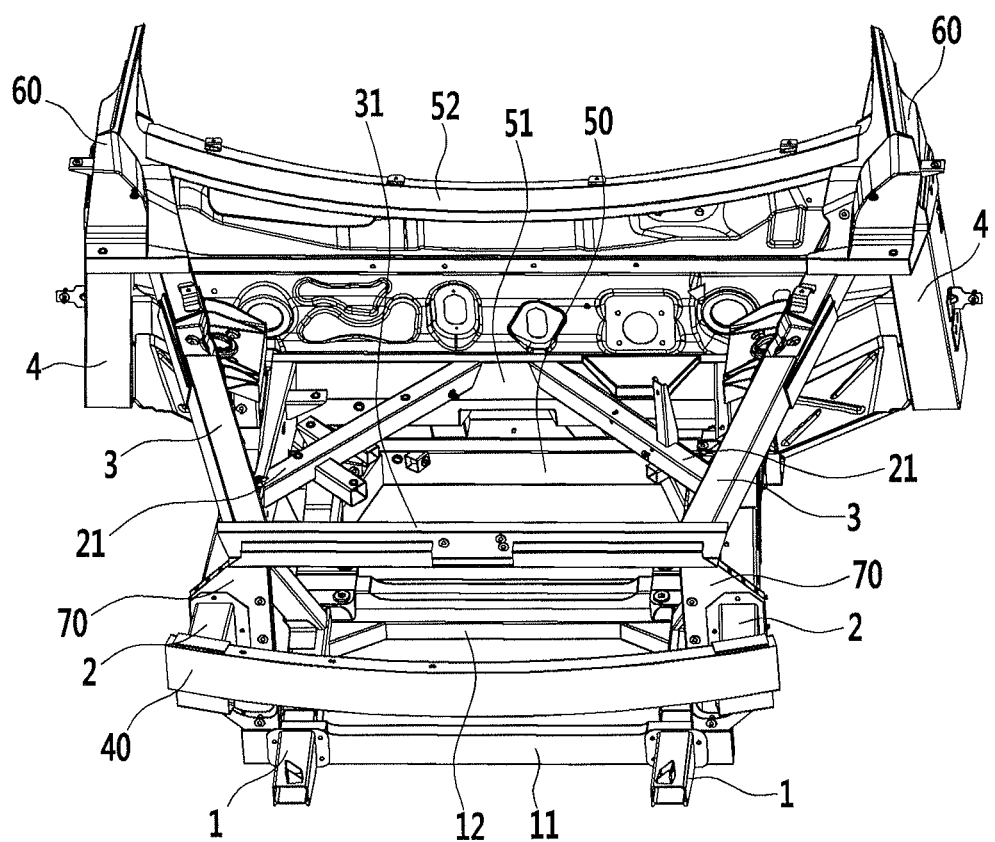
FIG. 2 is a top plan view of the exemplary front vehicle body according to the present invention.
Figure 3:
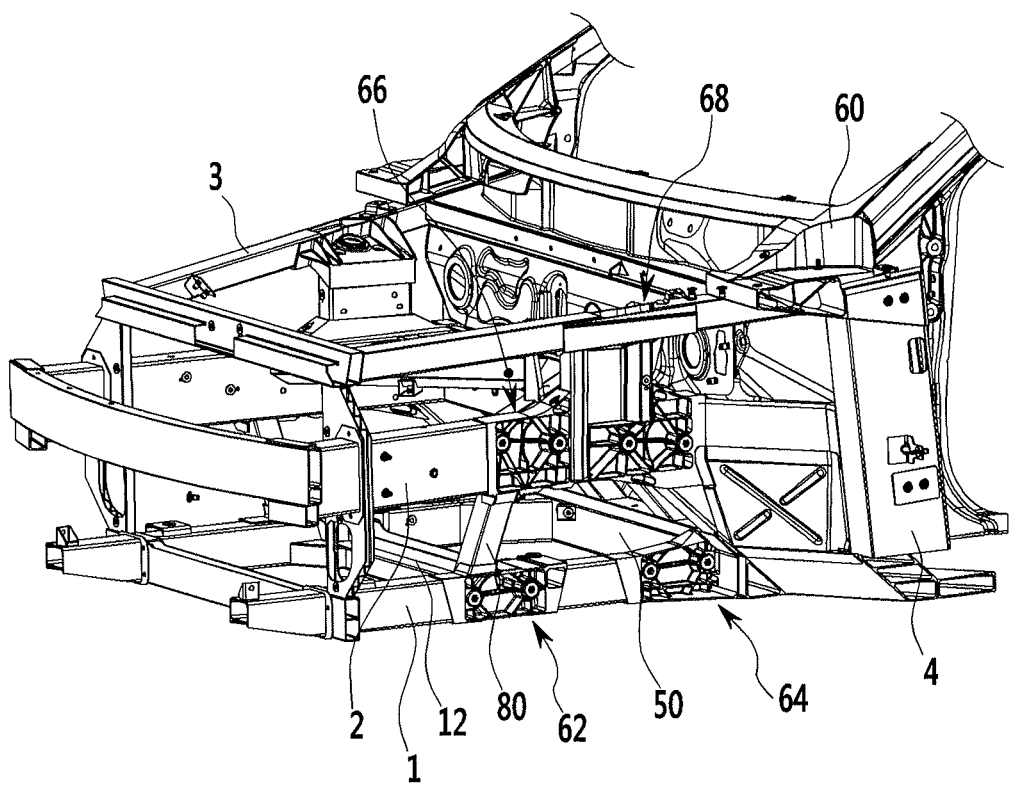
FIG. 3 is an enlarged perspective view of the exemplary front vehicle body according to the present invention.

Referring to FIG. 1 to FIG. 3, a front vehicle body structure according to various embodiments of the present invention may include front lower side members 1, front upper side members 2, and fender apron upper members 3, which are respectively extended along a length direction of a vehicle.

In a height direction of the vehicle, the front lower side members 1 may be disposed in a lower portion, the front upper side members 2 may be disposed in a middle portion, and the fender apron upper members 3 may be disposed in an upper portion.

Front portions of the front lower side members 1 that are disposed in the left and right sides along the length direction of the vehicle may be connected with each other by a front lower cross reinforcement member 11 extended along a width direction of the vehicle, middle portions of the front lower side members 1 may be connected with each other by a center lower cross reinforcement member 12 extended along a width direction of the vehicle, and rear portions of the front lower side members 1 may be connected with each other by a dash lower cross reinforcement member 50 extended along the width direction of the vehicle.

Front portions of the front upper side members 2 provided in the left and right sides of the vehicle along the length direction of the vehicle may be connected with each other by a bumper beam 40 extended along the width direction of the vehicle, and rear portions of the front upper side members 2 may be connected with each other by a dash center cross reinforcement member 51 extended along the width direction of the vehicle.

The left and right front upper side members 2 and the dash center cross reinforcement member 51 may be respectively connected with each other by two inclined reinforcement members 21 disposed to be inclined along the width direction and the length direction of the vehicle.

The two inclined reinforcement members 21 may be respectively disposed to be inclined toward the outer side of the width direction from a center portion of the length direction of the dash center cross reinforcement member 51 (i.e., the width direction of the vehicle) and thus may be attached to the left and right front upper side members 2, respectively.

Referring to FIG. 2, the front upper side members 2 may be more distanced from each other to the outside of the width direction of the vehicle than the front lower side members 1, and accordingly, when a front small overlap collision occurs, the front upper side members 2 properly absorb impact energy such that reaction performance against the front small overlap collision can be improved.

Two front pillar members 4 extended in the height direction of the vehicle may be disposed in the left and right sides of the width direction of the vehicle, respectively.

Front portions in the length direction of the vehicle of the left and right fender apron upper members 3 may be connected with each other by an upper cross reinforcement member 31 extended along the width direction of the vehicle, and rear end portions of the left and right fender apron upper members 3 may be connected to the left and right front pillar members 4 by first joints 60, respectively.

Lateral ends of a cowling upper cross reinforcement member 52 extended along the width direction of the vehicle may be combined to left and right first joints 60, respectively.

Figure 4:
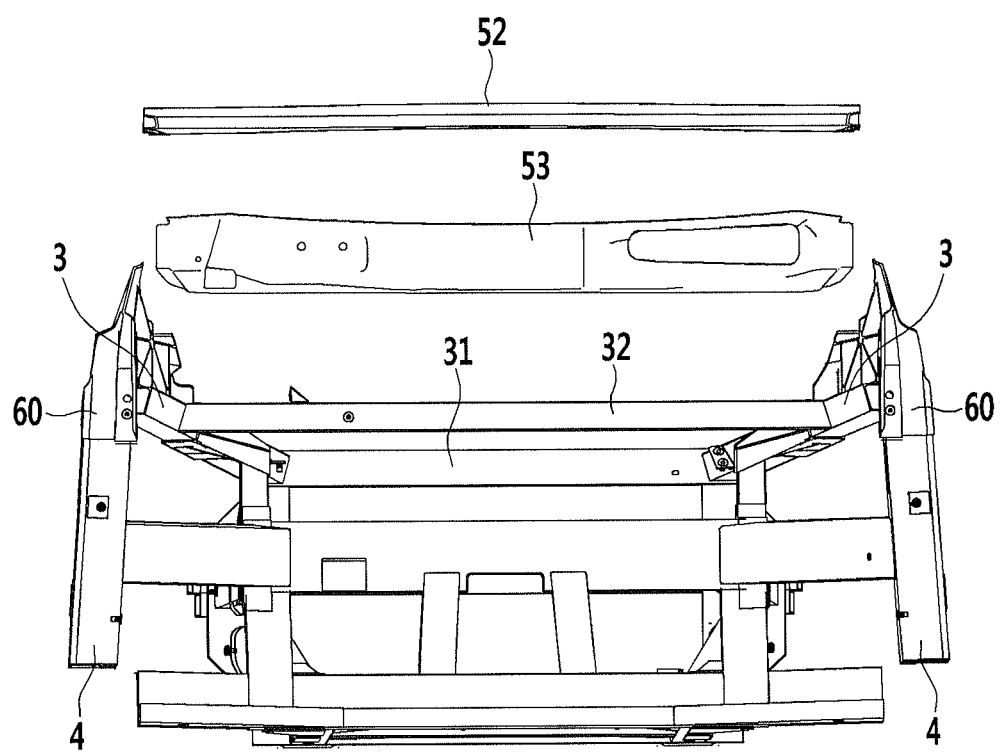
FIG. 4 is a perspective view separately illustrating a rear portion of the exemplary front vehicle body structure according to the present invention.

Referring to FIG. 4, rear portions of the left and right fender apron upper members 3 in the length direction of the vehicle may be connected with each other by a rear upper cross reinforcement member 32 extended in the width direction of the vehicle, and cowling panels 53 extended along the width direction of the vehicle may be provided between the cowling upper cross reinforcement member 52 and the rear upper cross reinforcement member 32 and to thus be integrally combined therewith.

The front lower side members 1, the front upper side members 2, and the fender apron upper members 3 may be connected with each other by reinforcement panels 70 extended in the height direction of the vehicle.

The front lower side members 1 and the front upper side members 2 may be connected with each other by a front side reinforcement member 80 extended in the height direction of the vehicle in a center portion of the length direction of the vehicle.

Second joints 62 may be combined to portions where the front lower side members 1 and the center lower cross reinforcement members 12 are connected with each other, third joints 64 may be combined to portions where the front lower side members 1 and the dash lower cross reinforcement members 50 are connected with each other, fourth joints 66 may be combined to the front upper side members 2, and fifth joints 68 may be combined to the fender apron upper members 3.

The first to fifth joints 60, 62, 64, 66, and 68 may be, for example, made of an aluminum material through a die-casting method, and each member may be made of an aluminum material through an extrusion method.

Figure 5:
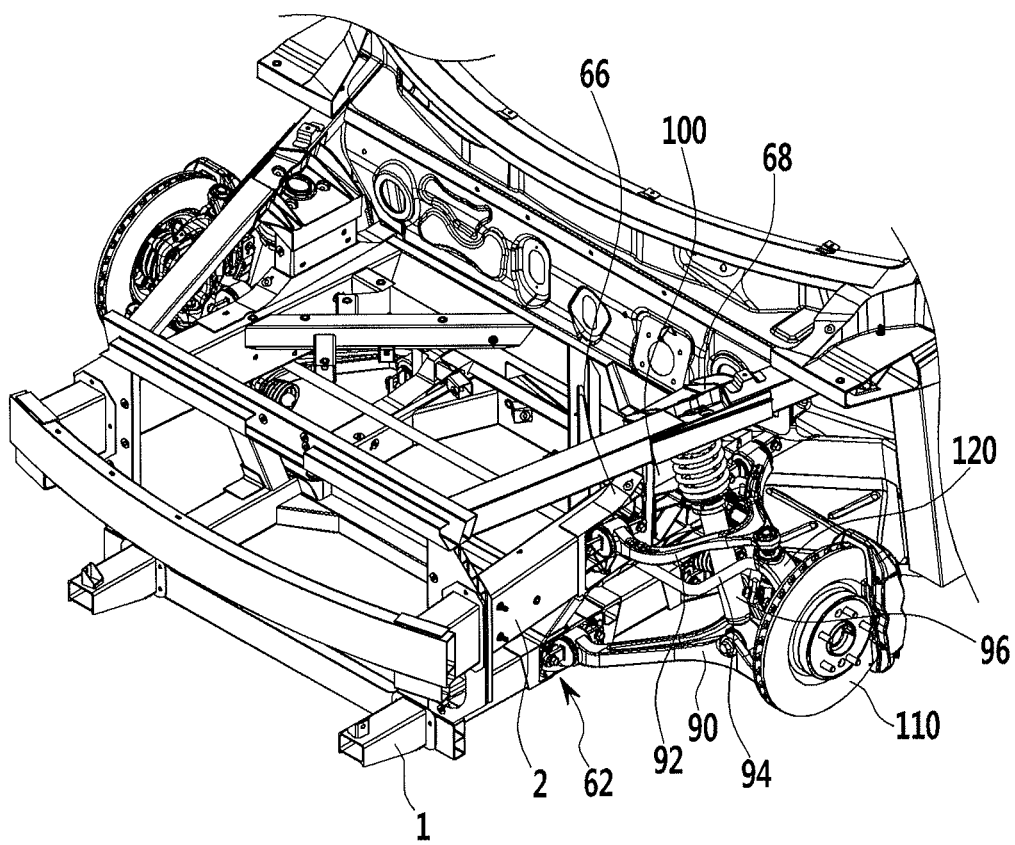
FIG. 5 is a perspective view illustrating a state that a suspension system is disposed in the exemplary front vehicle body structure according to the present invention.

Referring to FIG. 5, lateral ends of a lower arm 90 that forms a suspension arm are respectively engaged to the second and third joints 62 and 64 so as to support the second and third joints 62 and 64, lateral ends of an upper arm 92 of the suspension arm are respectively engaged to the fourth joint 66 to support the fourth joint 66, and a stabilizer bar 94 is extended along the width direction of the vehicle to control a moment behavior of the vehicle by being engaged to the fourth joint 66 so as to support the fourth joint.

The fourth joint 66 and the fifth joint 68 may be connected with each other by a shock absorber installation reinforcement member 100, and a shock absorber 96 of a suspension device may be supported by engaging an upper portion thereof to the fifth joint 68.

Reference numeral 110 denotes a brake disk provided for braking wheels and reference numeral 120 denotes a knuckle provided for steering the wheels, and the lower arm 90 and the upper arm 90 may be supported by being engaged to the knuckle.

Figure 6:
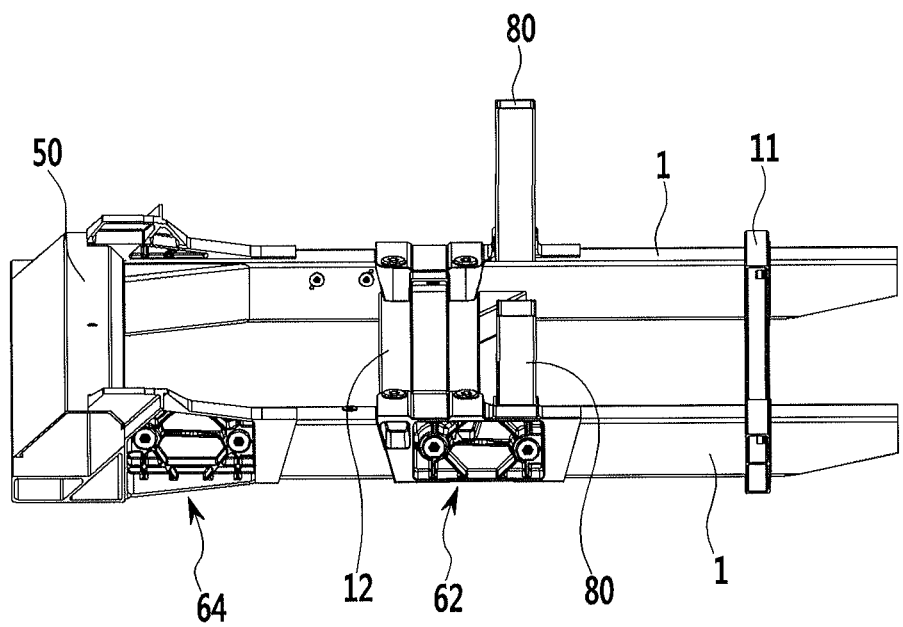
FIG. 6 is a coupled perspective view of a front lower side member and reinforcement members of the front lower side member of the exemplary front vehicle body structure according to the present invention.
Figure 7:
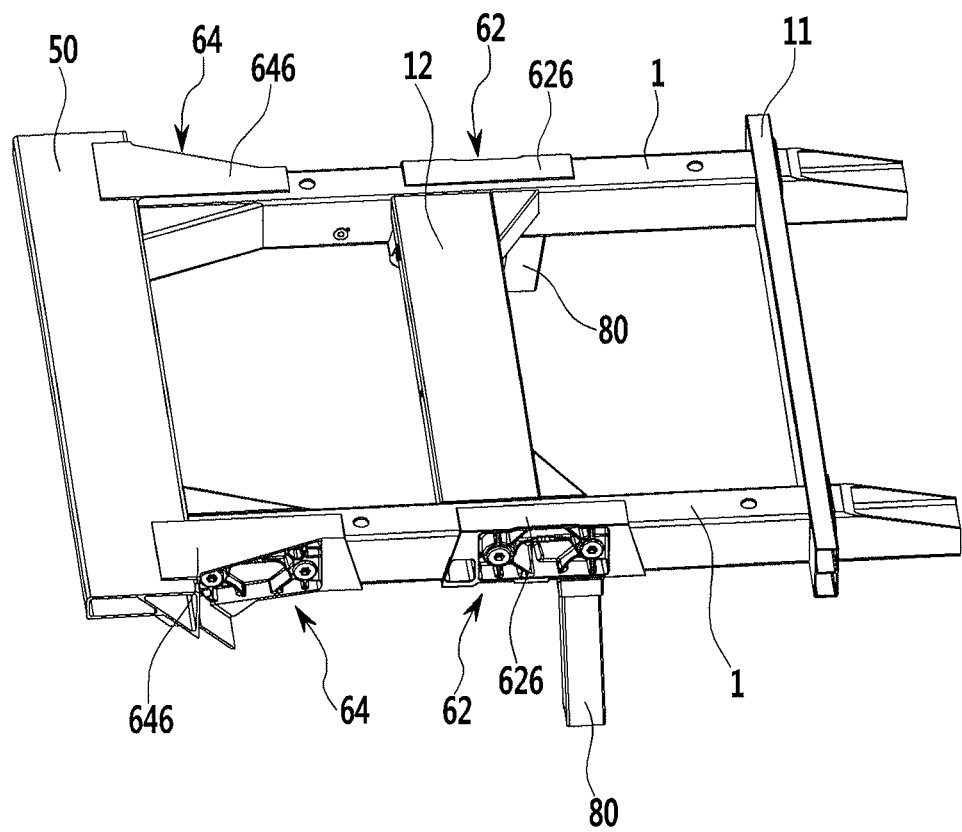
FIG. 7 is a perspective view illustrating a lower portion of FIG. 6.

Referring to FIG. 6 and FIG. 7, the second joint 62 may be combined to the front lower side members 1 and the center lower cross reinforcement member 12, and the third joint 64 may be combined to the front lower side members 1 and the dash lower cross reinforcement member 50.

Figure 8:
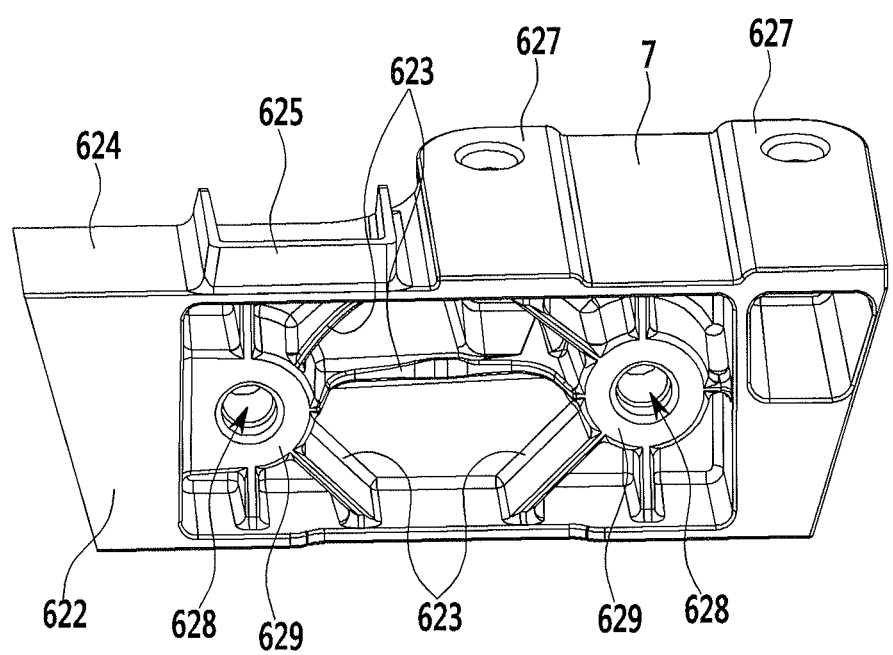
FIG. 8 is a perspective view of a second joint of the exemplary front vehicle body structure according to the present invention.

Referring to FIG. 8, the second joint 62 may include a second joint body 622 substantially formed in the shape of a quadrangular plate, an upper flange 624 bent to an inner side in the width direction of the vehicle from an upper end edge of the second joint body 622 and then combined to an upper surface of the front lower side member 1 in the height direction of the vehicle, and lower flanges 626 (refer to FIG. 7) bent to an inner side in the width direction of the vehicle from a lower end edge of the second joint body 622 and then combined to a bottom surface of the front lower side member 1 in the height direction of the vehicle.

A combining flange 625 to which one end of the front side reinforcement member 80 is inserted may be formed protruding upward along the height direction of the vehicle in the upper flange 624, and the second joint 62 may further include two extensions bosses 627 further extended to an inner side in the width direction of the vehicle from the upper flange 624 and then engaged to two positions of the center lower cross reinforcement member 12.

Two engaging bosses 629 provided with two engaging holes 628 that are disposed at a distance from each other back and forth along the length direction of the vehicle may be formed in a protruded manner in the second joint body 622, and one end of the lower arm 90 may be combined to the two engaging holes 628 by being engaged thereto.

A plurality of radial-shaped ribs 623 may be integrally protruded from the second joint body 622 to combine the two engaging bosses 629 and at the same time connect each engaging boss 629 to the second joint body 622 to enhance structural rigidity.

Figure 9:
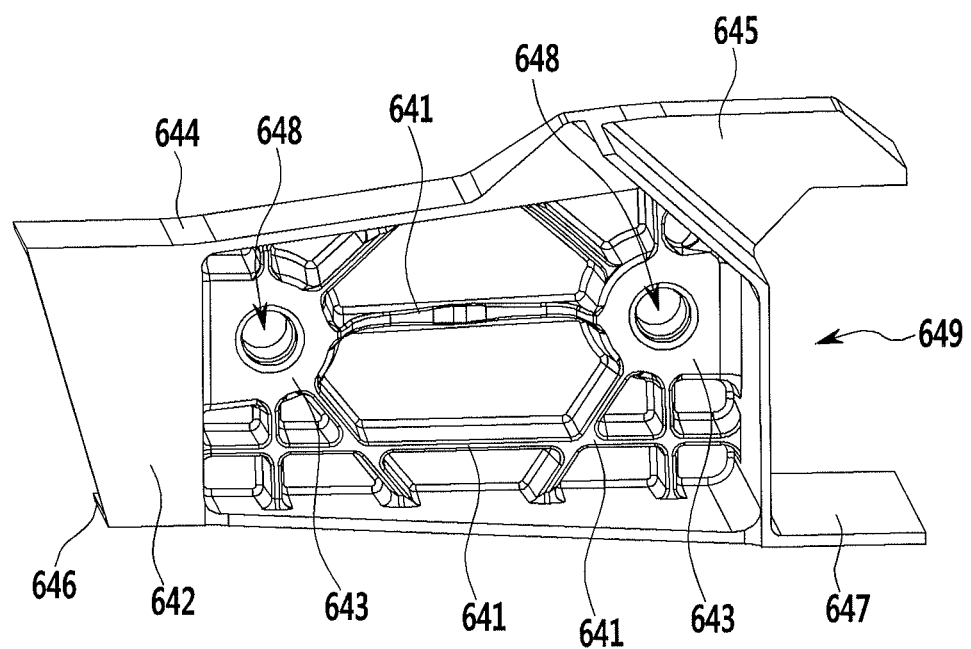
FIG. 9 is a perspective view of a third joint of the exemplary front vehicle body structure according to the present invention.

Referring to FIG. 9, the third joint 64 may include a third joint body 642 substantially formed in the shape of a quadrangular plate, an upper flange bent to an inner side of the width direction of the vehicle from an upper end edge of the third joint body 642 and then combined to an upper surface 644 of the front lower side member 1 in the height direction of the vehicle, and a lower flange 646 (refer to FIG. 7) bent to an inner side of the width direction of the vehicle from a lower end edge of the third joint body 642 and then combined to a bottom surface of the front lower side member 1 in the height direction of the vehicle.

The third joint 64 may further include an upper extension flange 645 further extended to a rear side from a rear upper end edge of the third joint body 642 in the length direction of the vehicle and thus disposed in an upper portion in the height direction of the vehicle, and a lower extension flange 647 further extended from a rear end edge of the third joint body 642 in the length direction of the vehicle and thus disposed in a lower portion in the height direction of the vehicle.

A combining groove 649 where the dash lower cross reinforcement member 50 is inserted to be combined thereto may be formed between the upper extension flange 645 and the lower extension flange 647.

Two engaging bosses 643 provided with two engaging holes 648 that are disposed at a distance from each other back and forth along the length direction of the vehicle may be formed protruded in the third joint body 642, and the other end of the lower arm 90 may be combined to the engaging holes 682 by being engaged thereto.

A plurality of radial-shaped ribs 641 may be integrally protruded from the third joint body 642 to combine the two engaging bosses 629 and at the same time connect each engaging boss 629 to the third joint body 642 to enhance structural rigidity.

Figure 10:
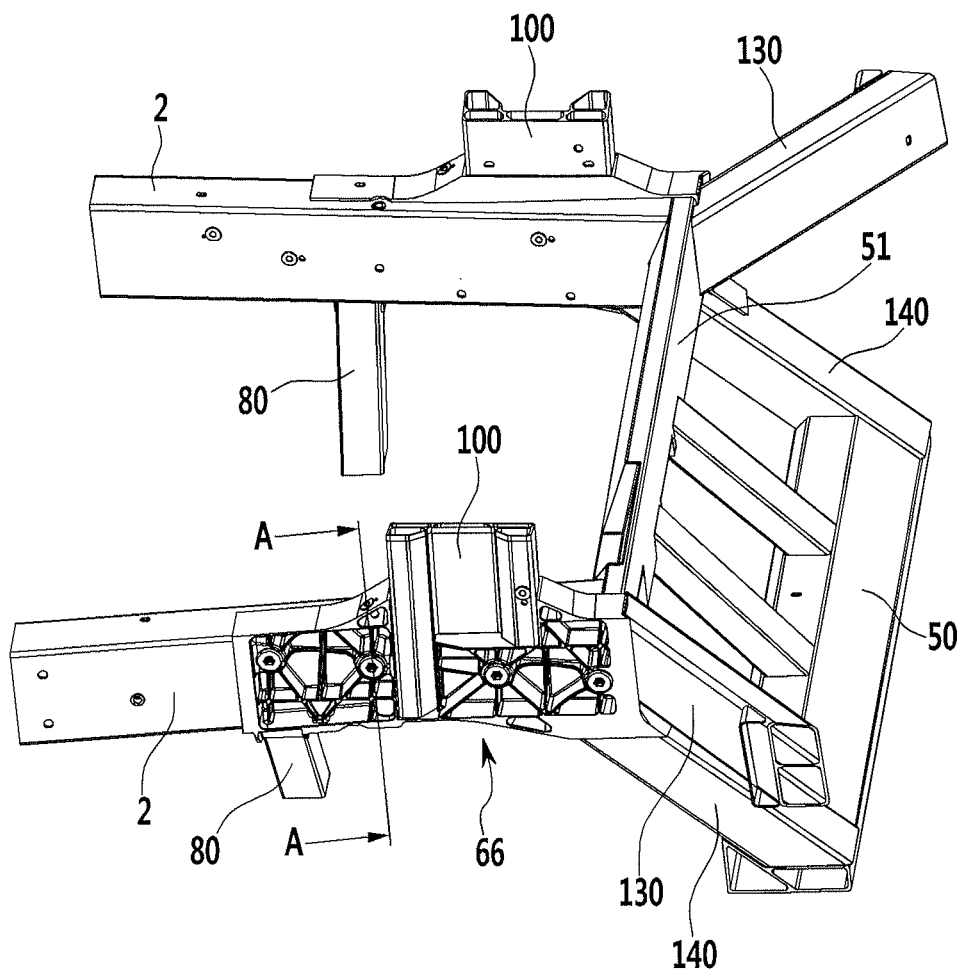
FIG. 10 is a coupled perspective view of a front upper side member and dash cross reinforcement members of the exemplary front vehicle body structure according to the present invention.

Referring to FIG. 10, the dash center cross reinforcement member 51 may be connected with the front pillar members 4 through rear side reinforcement members 130, and the front upper side members 2 may be connected with the lower cross reinforcement member 50 through a rear lower side reinforcement member 140.

Each fourth joint 66 is installed in each front upper side member 2, a front portion in the length direction of the vehicle is combined with the front side reinforcement member 80, a rear portion may be combined with the rear lower side reinforcement member 140, and the shock absorber installation reinforcement member 100 may be combined to the fourth joint 66 by being inserted therein.

Figure 11:
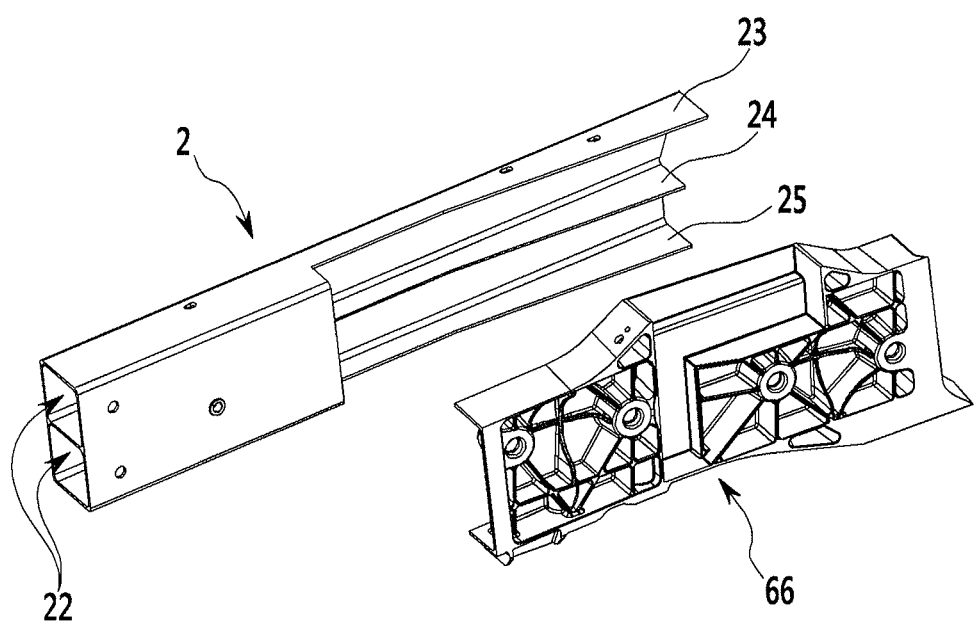
FIG. 11 is an exploded perspective view of the front upper side member and a fourth joint according to the present invention.
Figure 12:
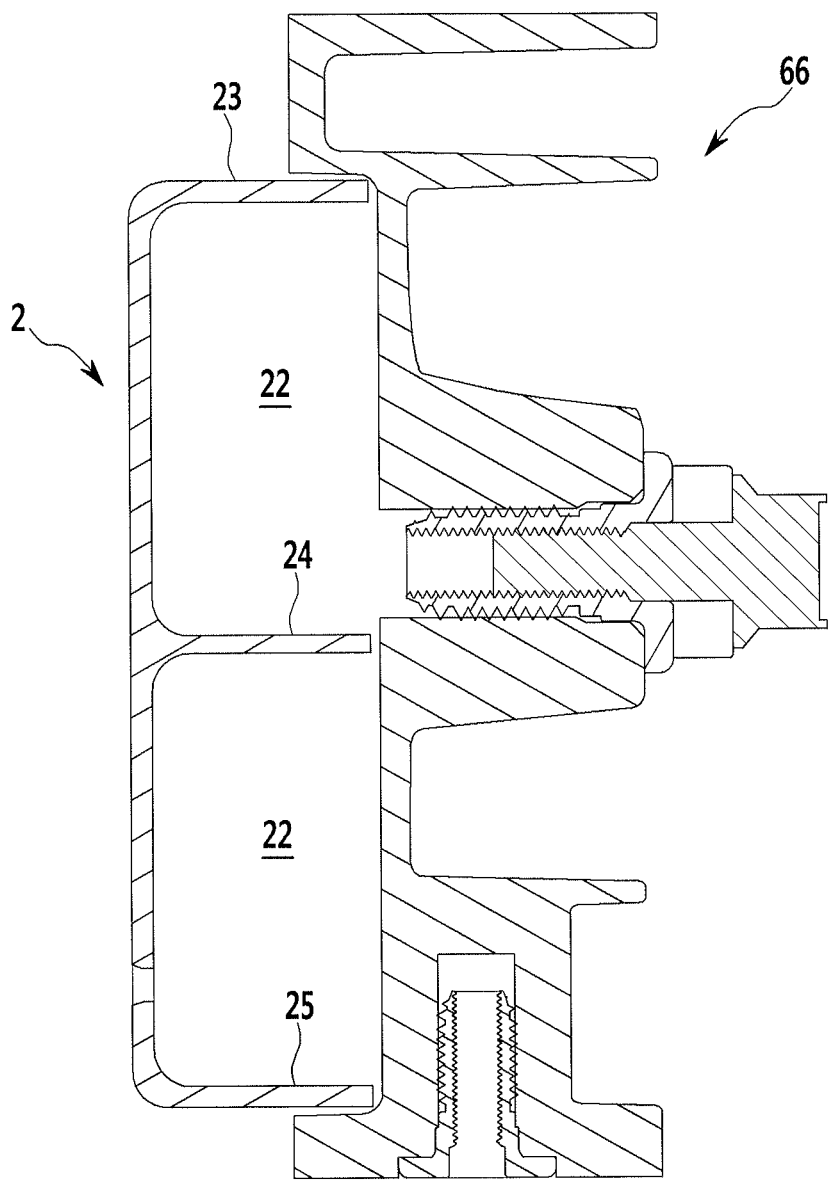
FIG. 12 is a cross-sectional view of FIG. 10, taken along the line A-A.

Referring to FIG. 11 and FIG. 12, in each front upper side member 2, vertically disposed double closed cross surfaces 22 may be extended along the length direction of the front upper side member 2, an upper wall 23, a middle wall 24, and a lower wall 25 forming the double closed cross surfaces 22 may be partially cut, and the fourth joint 66 may be combined with the front upper side member 2 while covering the cut-out portion.

Figure 13:
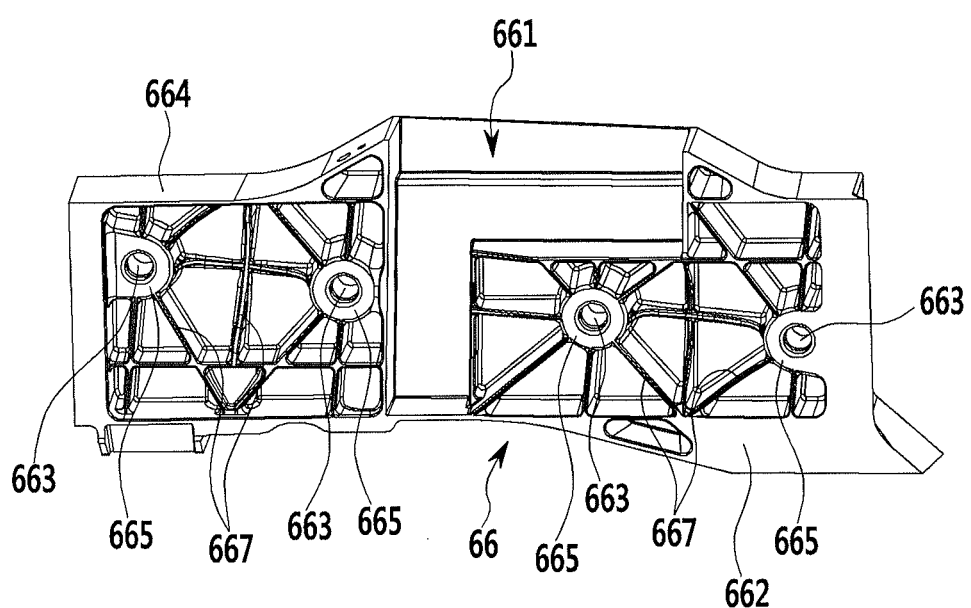
FIG. 13 is a perspective view of the fourth joint of the exemplary front vehicle body structure according to the present invention.
Figure 14:
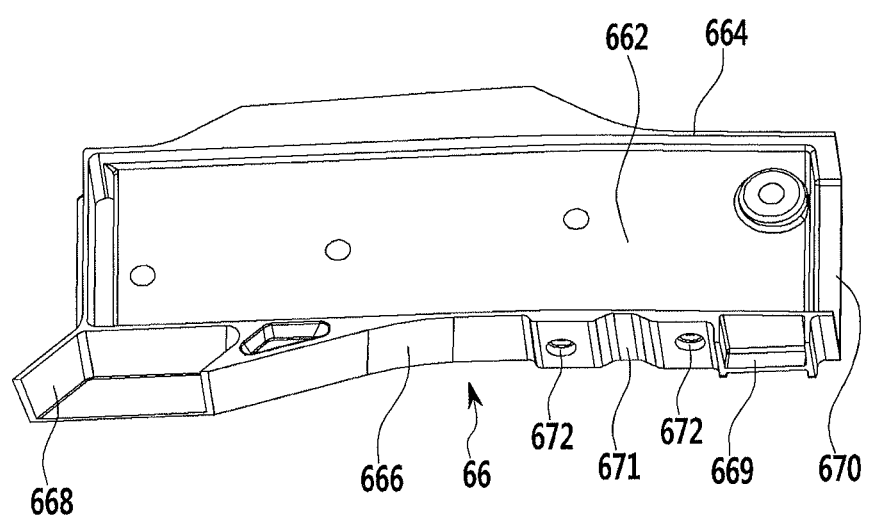
FIG. 14 is a rear-side perspective view of the fourth joint of the exemplary front vehicle body structure according to the present invention.

Referring to FIG. 13 and FIG. 14, the fourth joint 66 may include a fourth joint body 662 substantially formed in the shape of a quadrangular plate, an upper flange 664 bent to an inner side of the width direction of the vehicle from an upper end edge of the fourth joint body 662 and then combined to an upper surface of the front upper side member 2 in the height direction of the vehicle, and a lower flange 666 bent to an inner side of the width direction of the vehicle from a lower end edge of the fourth joint body 662 and then combined to a bottom surface of the front upper side member 2 in the height direction of the vehicle.

A combining groove 661 to which the shock absorber installation reinforcement member 100 is inserted may be formed in a substantially center portion of the fourth joint body 662, two engaging bosses 665 including two engaging holes 663 to which one end of the upper arms 92 is engaged are formed protruding in a front portion in the length direction of the vehicle with reference to the combining groove 661, two engaging bosses 665 including two engaging holes 663 to which the other end of the upper arm 92 is engaged are formed protruding in a rear portion in the length direction of the vehicle with reference to the combining groove 661, and in the length direction of the fourth joint body 662, and the two engaging bosses 663 are connected with each other by a plurality of radial-shaped reinforcement ribs 667 such that structural rigidity can be enhanced.

A first combining flange 668 where the other end of the front side reinforcement member 80 is combined by being inserted thereto and a second combining flange 669 where the rear lower side reinforcement member 140 is combined by being inserted thereto are provided in the lower flange 666, and a third combining flange 670 where the rear side reinforcement member 130 is combined by being inserted thereto may be provided in a rear end of the fourth joint body 662 in the length direction thereof.

A support groove 671 where the stabilizer bar 94 is supported by being inserted thereto and engaging holes 672 that engage the stabilizer bar 94 to the lower flange 666 with a mounting bracket (not shown) may be provided in the lower flange 666.

The first combining flange 668, the second combining flange 669, and the third combining flange 670 may respective have a cross-section substantially formed in the shape of "⊏".

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body structure comprising:
   front lower side members extended along a length direction of a vehicle, disposed in left and right sides along a width direction of the vehicle, and provided in a lower portion in a height direction of the vehicle;
   left side and right side front upper side members extended along the length direction of the vehicle, disposed in left and right sides respectively along the width direction of the vehicle, and provided higher in position than the front lower side members in the height direction of the vehicle; and
   fender apron upper members extended along the length direction of the vehicle, disposed in left and right sides along the width direction of the vehicle, and provided higher in position than the left side and right side front upper side members in the height direction of the vehicle,
   wherein the left side and right side front upper side members are further distanced to an outer side in the width direction than the front lower side members,
   wherein front portions of each of left side and the right side front upper side members are connected with each other by a bumper beam extended in the width direction of the vehicle, rear portions of each of the left side and the right side front upper side members are connected with each other by a dash center cross reinforcement member extended in the width direction of the vehicle, and the left side and the right side front upper side members and the dash center cross reinforcement member are connected with each other by two inclination reinforcement members respectively disposed obliquely to the width direction and the length direction of the vehicle.

2. The front vehicle body structure of claim 1, wherein front portions of each of the left side and the right side front lower side members in the length direction of the vehicle are connected with each other by a front lower cross reinforcement member extended along the width direction of the vehicle, center portions of each of the left side and the right side front lower side members are connected with each other by a center lower cross reinforcement member extended along the width direction of the vehicle, and rear portions of each of the left side and the right side front lower side members are connected with each other by a dash lower cross reinforcement member extended along the width direction of the vehicle.

3. The front vehicle body structure of claim 1, wherein the two inclination reinforcement members are disposed to be oblique toward an outer side in the width direction of the vehicle from a center portion in the width direction of the vehicle and connected to the left side and the right side front upper side members.

4. The front vehicle body structure of claim 1, wherein two front pillar members extended in the height direction of the vehicle are disposed in the left and right sides in the width direction of the vehicle, respectively, and
front portions of each of the left side and the right side fender apron upper members in the length direction of the vehicle are connected with each other by a front upper cross reinforcement member extended along the width direction of the vehicle, rear portions of each of the left side and the right side fender apron upper members are connected with each other by a rear upper cross reinforcement member extended along the width direction of the vehicle, and rear end portions of each of the left side and the right side fender apron upper members are connected to the left side and the right side front pillar members by first joints.

5. The front vehicle body structure of claim 4, wherein lateral ends of cowl upper cross reinforcement members that are extended along the width direction of the vehicle are coupled to the left and right first joints.

6. The front vehicle body structure of claim 1, wherein the front lower side members, the front upper side member, and the fender apron upper members are connected with each other by reinforcement panels extended in the height direction of the vehicle.

7. The front vehicle body structure of claim 5, wherein the front lower side members and the front upper side members are connected with each other by a front side reinforcement member extended in the height direction of the vehicle from a center portion in the length direction of the vehicle.

8. The front vehicle body structure of claim 7, wherein second joints are coupled to portions where the front lower side members and the center lower cross reinforcement member are connected with each other and third joints are coupled to portions where the front lower side members and the dash lower cross reinforcement member are connected with each other, and
a first end of a lower arm is engaged to each second joint and a second end of the lower arm is engaged to each third joint.

9. The front vehicle body structure of claim 8, wherein fourth joints are coupled to the front upper side members and lateral ends of an upper arm are engaged to each fourth joint.

10. The front vehicle body structure of claim 9, wherein fifth joints are coupled to the fender apron upper members,
each of the fourth joint and the fifth joint are connected with each other by a shock absorber installation reinforcement member, and
an upper portion of a shock absorber is supported by the fifth joint by being engaged thereto.

11. The front vehicle body structure of claim 9, wherein a stabilizer bar extended along the width direction of the vehicle to control a moment behavior of the vehicle is supported by the fourth joint by being engaged thereto.

12. The front vehicle body structure of claim 9, wherein the second joint comprises:
a second joint body formed in the shape of a quadrangular plate;
an upper flange bent to an inner side of the width direction of the vehicle from an upper end edge of the second joint body and then coupled to an upper surface of the front lower side member in the height direction of the vehicle; and
a lower flange bent to an inner side of the width direction of the vehicle from a lower end edge of the second joint body and then coupled to a bottom surface of the front lower side member in the height direction of the vehicle,
wherein a combining flange where a first end of the front side reinforcement member is coupled by being inserted thereto is formed protruding upward in the height direction of the vehicle in the upper flange,
two extension bosses extended further to the inner side of the width direction of the vehicle from the upper flange and thus engaged to two positions of the center lower cross member are provided in the upper flange,
two protruding engaging bosses provided with two engaging holes that are distanced from each other back and forth along the length direction of the vehicle are formed in the second joint body and thus the first end of the lower arm is coupled to the two engaging holes by being engaged thereto, and
a plurality of radial-shaped ribs is integrally protruded in the second joint body to connect the two engaging bosses to each other and connect each engaging boss to the second joint body so as to enhance structural rigidity.

13. The front vehicle body structure of claim 12, wherein the third joint comprises:
a third joint body formed in the shape of a quadrangular plate;
an upper flange bent to an inner side of the width direction of the vehicle from an upper end edge of the third joint body and then coupled to an upper surface of the front lower side member in the height direction of the vehicle;
a lower flange bent to an inner side of the width direction of the vehicle from a lower end edge of the third joint body and then coupled to a bottom surface of the front lower side member in the height direction of the vehicle;
an upper extension flange further extended backward from a rear upper end edge in a length direction of the third joint body and thus disposed in an upper portion in the height direction of the vehicle; and
a lower extension flange further extended backward from a rear lower end edge in the length direction of the third joint body and thus disposed in a lower portion in the height direction of the vehicle, wherein a combining groove where the dash lower cross reinforcement member is coupled by being inserted thereto is provided between the upper extension flange and the lower extension flange, two engaging bosses provided with two engaging holes that are disposed at a distance from each other along the length direction of the vehicle are formed protruded in the third joint body such that the second end of the lower arm is coupled to the engaging holes by being engaged thereto, and a plurality of radial-shaped ribs is formed integrally protruded from the third joint body to connect the two engaging bosses to each other and connect each engaging boss to the third joint body for enhancing structural rigidity.

14. The front vehicle body structure of claim 13, wherein the dash center cross reinforcement member is connected with the front pillar member through the rear side reinforcement member, and the front upper side member is connected with the dash lower cross reinforcement member through the rear lower side reinforcement member.

15. The front vehicle body structure of claim 14, wherein a front portion of the fourth joint in the length direction of the vehicle is coupled with the front side reinforcement member, a rear portion of the fourth joint is coupled with the rear side reinforcement member and the rear lower side reinforcement member, and the shock absorber installation reinforcement member is coupled to the fourth joint by being inserted therein.

16. The front vehicle body structure of claim 15, wherein vertically disposed double closed cross surfaces of the front upper side member are extended along the length direction of the front upper side member, an upper wall, a middle wall, and a lower wall forming the double closed cross surfaces are partially cut, and the fourth joint is coupled with the front upper side member while covering the cut portion.

17. The front vehicle body structure of claim 16, wherein the fourth joint comprises:

a fourth joint body formed in a shape of a quadrangular plate;

an upper flange bent to an inner side of the width direction of the vehicle from an upper end edge of the fourth joint body and then coupled to an upper surface of the front upper side member in the height direction of the vehicle; and a lower flange bent to an inner side of the width direction of the vehicle from a lower end edge of the fourth joint body and then coupled to a bottom side of the front upper side member in the height direction of the vehicle, wherein a combining groove where the shock absorber installation reinforcement member is coupled by being inserted therein is formed in a substantially center portion of the fourth joint body in the length direction of the fourth joint body, two engaging bosses provided with two engaging holes to which a first end of the upper arm is engaged are formed in a protruded manner in a front portion in the length direction of the vehicle with reference to the combining groove, two engaging bosses provided with two engaging holes to which a second end of the upper arm are formed in a protruded manner in a rear portion in the length direction of the vehicle with reference to the combining groove, and the two engaging bosses are connected with each other by a plurality of radial-shaped ribs for enhancing structural rigidity.

18. The front vehicle body structure of claim 17, wherein a first combining flange where a second end of the front side reinforcement member is coupled by being inserted thereto, a second combining flange where the rear lower side reinforcement member is coupled by being inserted thereto, a support groove where the stabilizer bar is supported by being inserted thereto, and an engaging groove engaging the stabilizer bar are provided in the lower flange, and a third combining flange where the rear side reinforcement member is coupled by being inserted thereto is provided in a rear portion in the length direction of the fourth joint body.

19. The front vehicle body structure of claim 18, wherein each member is made of an aluminum material through an extrusion method, and each joint is made of an aluminum material through a die-casting method.

* * * * *